United States Patent Office 3,431,008
Patented Mar. 4, 1969

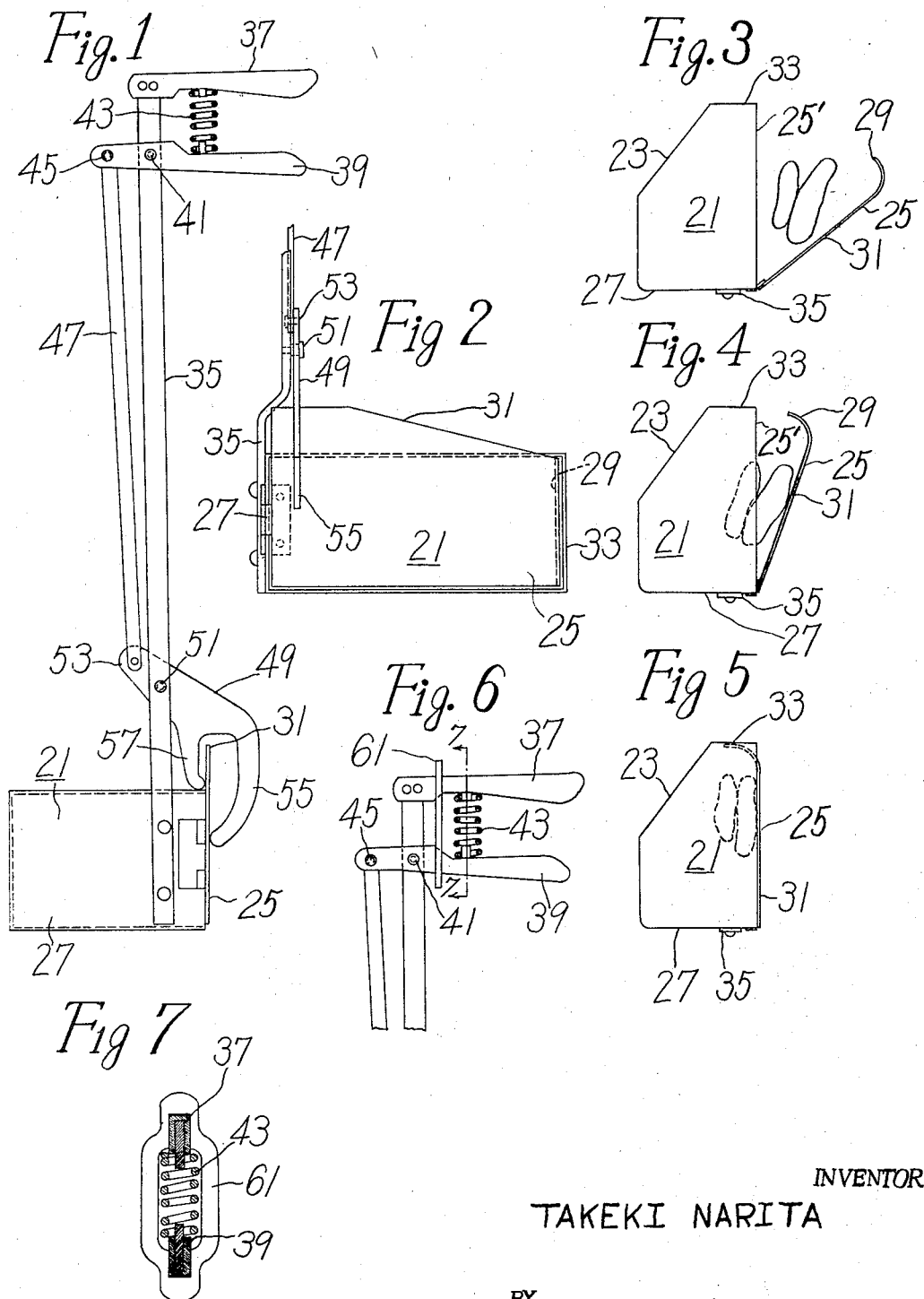

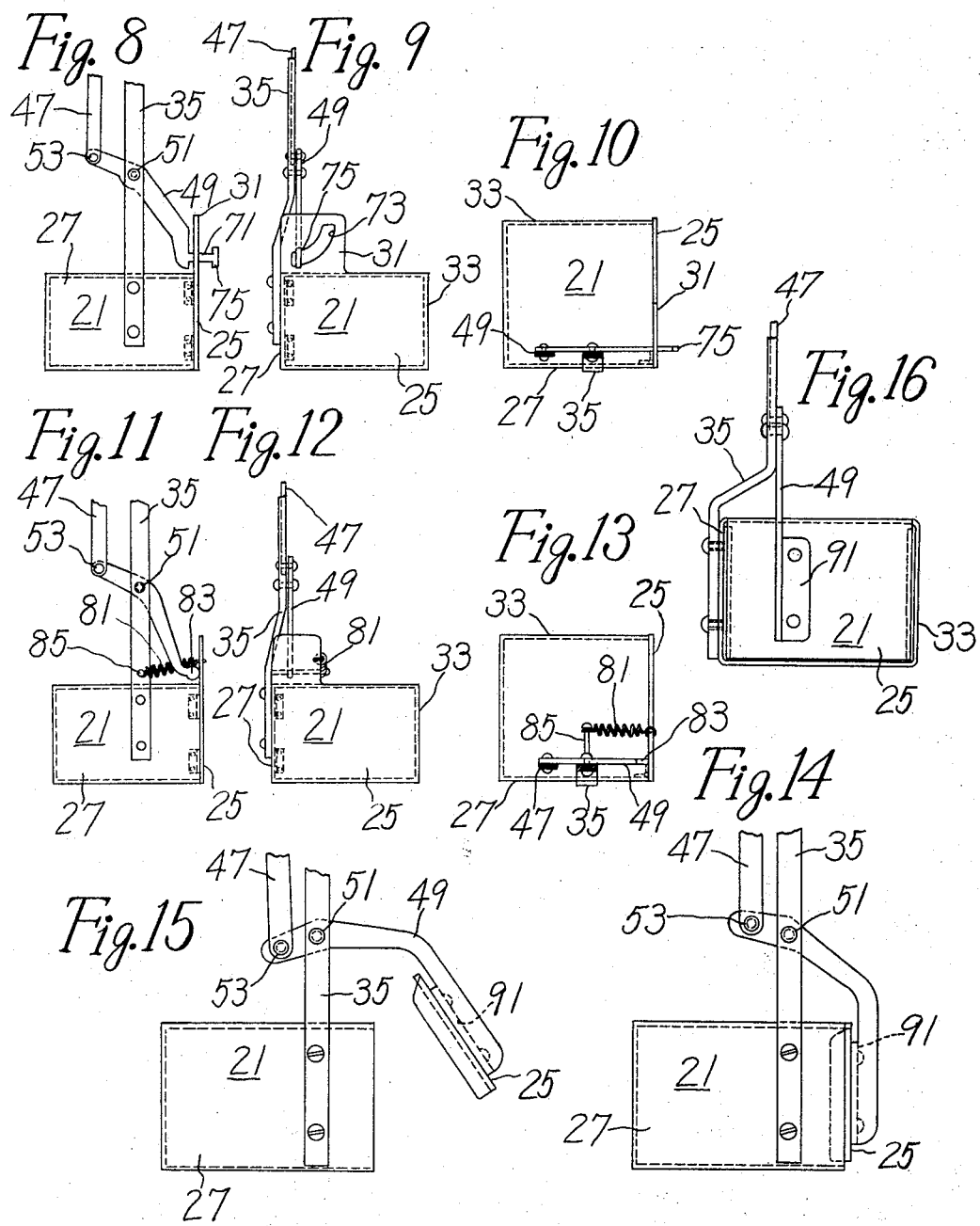

3,431,008
PORTABLE SCAVENGING MEANS FOR REMOVING FECES OF ANIMALS AND OTHER UNTOUCHABLE SOLIDS
Takeki Narita, 25–13, 1-chome, Kitamagome,
Ota-ka, Tokyo, Japan
Filed Nov. 14, 1967, Ser. No. 682,962
Claims priority, application Japan, July 22, 1967,
42/47,314
U.S. Cl. 294—55              6 Claims
Int. Cl. A01b 1/02; A47f 13/08

ABSTRACT OF THE DISCLOSURE

This disclosure relates to an invention in the portable scavenging means for removing feces of animals as dogs, and other untouchable solids from as streets. It is believed that there has not been proposed any means for such a peculiar purpose as this invention other than extremely primitive means. The portable scavenging means in accordance with this invention is a stick having a box on the lower end thereof. The box has a lid which may be opened from the top of the stick and automatically closed.

BACKGROUND OF THE INVENTION

Field of the invention

Theoretically speaking, the field of art to which this invention pertains would be the street scavenging means. However, practically speaking, the field would be the kennel implements. It is also possible to consider the field to be the container or the transferring means. In the U.S. patent classification, this invention would be classified into Class 15, subclass 1 or 2, Class 43, subclass 1, Class 94, subclass 1, Class 119, subclass 1, or Class 232, subclass 44.

Description of the prior art

It is believed that there has been well known only such an extremely primitive means as to use an empty can and a broom for attaining the primary object of this invention and that none has been proposed which is comparable with this invention.

Summary of the invention

Briefly stated in accordance with one aspect of this invention, there is provided a portable scavenging means for removing feces of animals as dogs, and other untouchable solids from as streets, which comprises a box having a side opening, a manually openable and automatically shuttable lid adapted to close the opening, a stick having an end fixed on and to a side wall of the box, and a means for controlling the lid from the other end of the stick. The controlling means comprises a lever, a link, an arm, and a spring. The lever is adapted to be gripped manually together with a handle fixed to the other end of the stick so as to close the lever towards the handle against the action of the spring. The arm is swung intermediate the link by the lever so as to move the lid between a closed position and an opened position for the opening of the box.

By virtue of the foregoing structure, it is very easy to take up feces of an animal as a dog into the box for removing the same from as streets when one takes walks on the street leading the dog, so as to keep the street clean and hygienic. In addition, it is also possible to catch or collect untouchable solids as poisonous worms by this scavenging means in accordance with this invention. The structure of this scavenging means is foolproof, durable, and inexpensive. Appearance of the scavenging means carried by a walker is well since the content of the box is not exposed.

BRIEF DESCRIPTION OF THE DRAWING

The invention will be better understood and other objects and additional advantages of the invention will become apparent upon perusal of the following description taken in connection with the drawings, in which:

FIG. 1 is a side elevational view of a portable scavenging means embodying this invention;

FIG. 2 is a front elevational view thereof with the upper part of the stick removed;

FIGS. 3, 4 and 5 are plan views of the box thereof showing the opened, intermediate, and closed positions;

FIG. 6 is a side elevational view of a modification of the portable scavenging means with the lower part removed;

FIG. 7 is an enlarged partly sectional front view of the restricting ring shown in FIG. 6;

FIG. 8 is a side elevational view of another embodiment of this invention with the upper part removed;

FIG. 9 is a front elevational view thereof;

FIG. 10 is a plan view of the box thereof;

FIG. 11 is a side elevational view of still another embodiment of this invention with the upper part removed;

FIG. 12 is a front elevational view thereof;

FIG. 13 is a plan view of the box thereof;

FIG. 14 is a side elevational view of further another embodiment of this invention with the upper part removed;

FIG. 15 is a similar view but showing in the opened position; and

FIG. 16 is a front elevational view thereof with the upper part removed, in the closed position.

Similar numerals refer to similar parts throughout the several views.

DESCRIPTION OF THE PREFERRED EMBODIMENTS

Referring more particularly to the drawings, the preferred embodiments of this invention will now be described; however, this description will be understood to be illustrative of the invention and not as limiting it to the particular constructions shown and described. In the embodiment of the invention shown in FIGS. 1 to 5, inclusive, numeral 21 denotes a box of a rectangular parallelopiped having an additional angle side wall 23. A side 25', which is not adjacent to the angle side wall 23, is left open so as to form an opening for the box 21. The opening is provided with a lid 25. The lid 25 is hinged on a vertical edge of the other side wall 27 which is also not adjacent to the angle side wall 23, and the vertical edge is remote therefrom. The lid 25 is higher than the box 21 at the hinged edge but has the same height with the box 21 at the free edge 29 so that the top edge 31 is slant. The free edge 29 is turned in so that the extremity of the free edge 29 is adapted to close inside another side wall 33 of the box 21, which is adjacent to the angle side wall 23.

A stick 35 is fixed vertically outside the side wall 27, extended upwards and provided with a handle 37 on the top end thereof, which is horizontally extended above the hinged edge of the side wall 27. A lever 39 is pivoted on the stick 35 at 41, one end thereof being extended below and along the handle 37 in such a manner that the end may be gripped together with the handle 37 manually. A coil spring 43 is compressed between the handle 37 and the lever 39 so as to hold the two members normally apart from each other so far as not gripped as above. The other end 45 of the lever 39 is pivoted with the top end of a link 47 which is extended downwards along the stick 35.

An arm 49 is pivoted to the stick 35 at 51 and the rear end of the arm 49 is swingably connected with the lower end of the link 47 at 53 so that the arm 49 is linked swingably in the same direction with the lever 39 intermediate the link 47. The front end of the arm 49 is forked into a long downturned upper finger 55 and a short upturned lower finger 57, between which the top edge 31 of the lid 25 is loosely inserted.

In operation, when the lever 39 is gripped together with the handle 37 against the action of the coil spring 43, the front end of the lever 39 is raised so that the front end of the arm 49 is also raised by virtue of the linking connection with the link 47. When the pivoted arm 49 is upwards swung, the extremity of the long downturned finger 55 of the arm 49 is moved forward and upwards apart from the lid 25 while the extremity of the short upturned finger 57 of the arm 49 is moved also forward and upwards along a shorter locus than the former so as to push the lid 25 forward. The two fingers 55 and 57 differ from each other in length from the pivot 51 and swung upwards concurrently, so that the vertical clearance therebetween increases in accordance with the upward swing, ending in that the lid 25 is easily hinged towards the opened position to open the opening of the box 21.

The operator may then place the scavenging means on feces easily in such a manner that the feces are positioned between the opening of the box 21 and the opened lid 25, while keeping the handle 37 gripped together with the lever 39. When the lever 39 is released, the box 21 is closed by the lid 25 automatically by the action of the spring 43 so as to bring the feces inside the box 21. When the box 21 has been closed up by the lid 25, the vertical clearance between the extremities of the two fingers 55 and 57 becomes sufficiently narrow by virtue of the form of the arm 49, so that the box 21 is enough tightly closed by the lid 25 not to leak the content out of the box 21 by the action of the spring 43.

It is not an essential matter that the box 21 has the angle side wall 23, but a substantially rectangular parallelopiped box not having the angle side well is similarly useful as shown in FIGS. 10 and 13. It is also not an essential matter that the lid 25 has a slant top edge 31, but such a lid as having an upward extension adjacent to the hinged edge is also useful if the extension is broad enough to engage with the arm 49, as shown in FIGS. 9 and 12.

Referring now to FIGS. 6 and 7, it is possible, in a modification of the foregoing embodiment, to keep the lever 39 in the state of being gripped together with the handle 37 in order to keep the lid 25 in the opened position. To this end, in the modification, there is provided an oblong rounded restricting ring 61 having an upper inside guide slit and a lower inside guide slit. The handle 37 and the lever 39 are loosely inserted into the slits of the ring 61 behind the coil spring 43. In case the lever 39 is to be kept in the gripped position, the lower end of the ring 61 may be shifted forward manually so that the lever 39 is prevented, against the action of the coil spring 43, from restoring to the normal position. By virtue of this restricting ring 61, it is very facilitated to clean and dry the inside of the box 21. This restricting ring 61 may be provided advantageously in any of the following embodiments in the same manner with the foregoing embodiment.

Referring now to FIGS. 8, 9 and 10, another embodiment of this invention is illustrated, in which the arm 49, the lid 25, and the connection thereof with the former are modified. In this modification, the arm 49 is not forked but simply turned downwards and the extremity thereof is provided with a forward extended pin 71. There is formed a segmental slit 73 in the upper part of the lid 25, which is extended from a lower point adjacent to the hinged edge to an upper point remote therefrom along a downwards inflated curve. The pin 71 is loosely inserted into the segmental slit 73 and provided with a boss 75 on the extremity thereof. By virtue of the above-stated form and arranged of the segmental slit 73, it is possible to swing the horizontally hinged lid 25 in accordance with the vertical swinging motion of the pin 71 of the arm 49.

Referring now to FIGS. 11, 12 and 13, still another embodiment of this invention is illustrated, in which the closing operation of the lid 25 depends on the action of another spring 81. In this embodiment, the arm 49 is neither forked into the two fingers 55, 57 nor extended into the pin 71 but has a mere rounded front end 83. When the lever 39 is gripped together with the handle 37 against the action of the coil spring 43, the front end 83 of the arm 39 pushes the lid 25 forward so as to open the box 21. However, for closing the lid 25 is quite differently operated. To this end, the coil spring 81 is anchored on the lid 25 and a branch 85 of the stick 35, they being stretched from each other by the action of the coil spring 81, so that the lid 25 tends to return to the closed position, if the lid 25 is not supported in the opened position by the front end 83 of the arm 49.

Referring now to FIGS. 14, 15 and 16, further another embodiment of this invention is illustrated, in which the lid 25 itself is not hinged on a side wall of the box 21 but fixed to the swingable arm 49. The arm 49 is neither forked into the two fingers 55, 57 nor extended into the pin 71 in this embodiment also, but downturned into a straight extremity thereof having a flange 91 which is secured on the outer surface of the lid 25. By virtue of the above structure, when the lever 39 is gripped together with the handle 37, the lid 25 is not swung horizontally but removed forward and upwards in accordance with the vertical swinging motion of the arm 49. Further, in this embodiment, it is neither necessary to form a slant top edge nor to provide an upward extension of the lid 25, but the lid 25 is of a mere rectangle corresponding to the opening of the box 21.

While particular embodiments of the invention have been illustrated and described, further modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and desired to be secured by Letters Patent of the United States is:

1. A portable scavenging apparatus for removing feces of animals and other untouchable solids comprising a box having an opening therein and a lid adapted to selectively close and open said opening, a stick having a first end mounted to a wall of said box, means for moving said lid selectively between it closed and open positions including a lever, a link, an arm and a spring, said lever being pivotally mounted at a predetermined point intermediate its ends to said stick at a predetermined point adjacent the second end of said stick, a handle mounted in fixed position to said second end of said stick to provide a stationary member toward which one end of said lever may be manually pivoted, said spring being interposed between said handle and said lever to normally urge said one end of said lever away from said handle, said link being attached to the opposite end of said lever so as not to be moved away from said handle when said lever is manually pivoted toward said handle, said link being mounted to said arm and said arm being operative when said lever and said link are moved to move said lid between its closed and open positions.

2. A portable scavenging means for removing feces of animals and other untouchable solids, as claimed in claim 1, in which said lid is hinged on said side wall, inserted between two fingers of said arm, and operated by said fingers so as to be hinged between said closed position and said opened position in accordance with said swinging motion of said arm.

3. A portable scavenging means for removing feces of animals and other untouchable solids, as claimed in claim 1, in which said lid is hinged on said side wall and provided with a slit, an extension of said arm being inserted into said slit so as to confine said hinging motion of said lid along and within a length of said extension, whereby said lid is hinged between said closed position and said opened position in accordance with said swinging motion of said arm.

4. A portable scavenging means for removing feces of animals and other untouchable solids, as claimed in claim 1, in which said lid is hinged on said side wall and tends to close said opening by the action of another spring, said lid being adapted to be hinged towards said opened position against the action of the last-named spring by being pushed by said arm swung against the action of the first-named spring, and towards said closed position by the action of the last-named spring when said arm is retired by the action of the first-named spring.

5. A portable scavenging means for removing feces of animals and other untouchable solids, as claimed in claim 1, in which said lid is fixed to said arm and adapted to be moved between said closed position and another opened position in accordance with said swinging motion of said arm.

6. A portable scavenging means for removing feces of animals and other untouchable solids, as in claim 1 wherein restricting means is added for keeping said lever in the state of being gripped together with said handle so as to keep said lid in said open position.

References Cited

UNITED STATES PATENTS

| | | | |
|---|---|---|---|
| 507,826 | 10/1893 | Miller | 294—55 |
| 2,317,489 | 4/1943 | Scull | 294—55 |
| 2,427,486 | 9/1947 | Wyland | 294—55 |

ANDRES H. NIELSEN, *Primary Examiner.*